US012580967B2

(12) United States Patent  
Sawal et al.

(10) Patent No.: US 12,580,967 B2  
(45) Date of Patent: Mar. 17, 2026

(54) CONTEXTUAL SECURITY POLICY ENGINE FOR COMPUTE NODE CLUSTERS

(71) Applicant: Dell Products L.P., Round Rock, TX (US)

(72) Inventors: Vinay Sawal, Fremont, CA (US); Viswanath Ponnuru, Bangalore (IN); Igor Pedan, Vienna, VA (US); Sumanth Vidyadhara, Bangalore (IN); Magesh Kumar Sivaswamy, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 263 days.

(21) Appl. No.: 18/363,880

(22) Filed: Aug. 2, 2023

(65) Prior Publication Data

US 2025/0047712 A1 Feb. 6, 2025

(51) Int. Cl.  
*H04L 9/40* (2022.01)  
*G06F 21/60* (2013.01)

(52) U.S. Cl.  
CPC ............ *H04L 63/20* (2013.01); *G06F 21/602* (2013.01)

(58) Field of Classification Search  
CPC ....... H04L 63/20; G06F 21/602; G06F 21/575  
USPC ............................................................ 726/1  
See application file for complete search history.

(56) References Cited

U.S. PATENT DOCUMENTS

| | | | | |
|---|---|---|---|---|
| 11,847,237 B1 * | 12/2023 | Attfield | ................. | G06F 21/572 |
| 2013/0145172 A1 * | 6/2013 | Shablygin | ............... | G06F 21/33 |
| | | | | 713/185 |
| 2013/0145173 A1 * | 6/2013 | Shablygin | ............... | G06F 21/34 |
| | | | | 713/185 |
| 2013/0208893 A1 * | 8/2013 | Shablygin | ............. | H04L 9/0894 |
| | | | | 380/277 |
| 2014/0310509 A1 * | 10/2014 | Potlapally | ........... | G06F 11/1417 |
| | | | | 713/2 |
| 2017/0255472 A1 * | 9/2017 | Potlapally | ............. | G06F 9/4401 |
| 2018/0217943 A1 * | 8/2018 | Crowe | ............... | G01D 5/24457 |
| 2020/0195433 A1 * | 6/2020 | Collier | ................. | G06F 21/602 |

FOREIGN PATENT DOCUMENTS

| | | | | | |
|---|---|---|---|---|---|
| CN | | 114817931 A | * | 7/2022 | ........... G06F 21/602 |

* cited by examiner

*Primary Examiner* — Aubrey H Wyszynski

(74) *Attorney, Agent, or Firm* — Amin, Turocy & Watson, LLP

(57) ABSTRACT

The technology described herein, which can be incorporated into a bare metal as a service environment, is generally directed towards monitoring retrieving and analyzing security configuration stored on recovery partition storage (e.g., OEM partition drives), which can contain critical logs, error state data, and boot critical security data. A backend security policy engine enforces security context configuration policy data, including to prevent malicious attacks on the backend services. Bare metal in-band compute device health is monitored by an out-of-band network using telemetry data services. When an unrecoverable system state is detected, the out-of-band network activates the recovery partition storage for recording the system sensitive logs, debug data and error states, which is stored as encrypted per security policies. Security policy is enforced, including on system logs, to prevent data tampering and/or malicious attacks. A recovery scenario is performed to restore operation of the compute device.

20 Claims, 10 Drawing Sheets

*Continued at FIG. 3*

Figure 3:
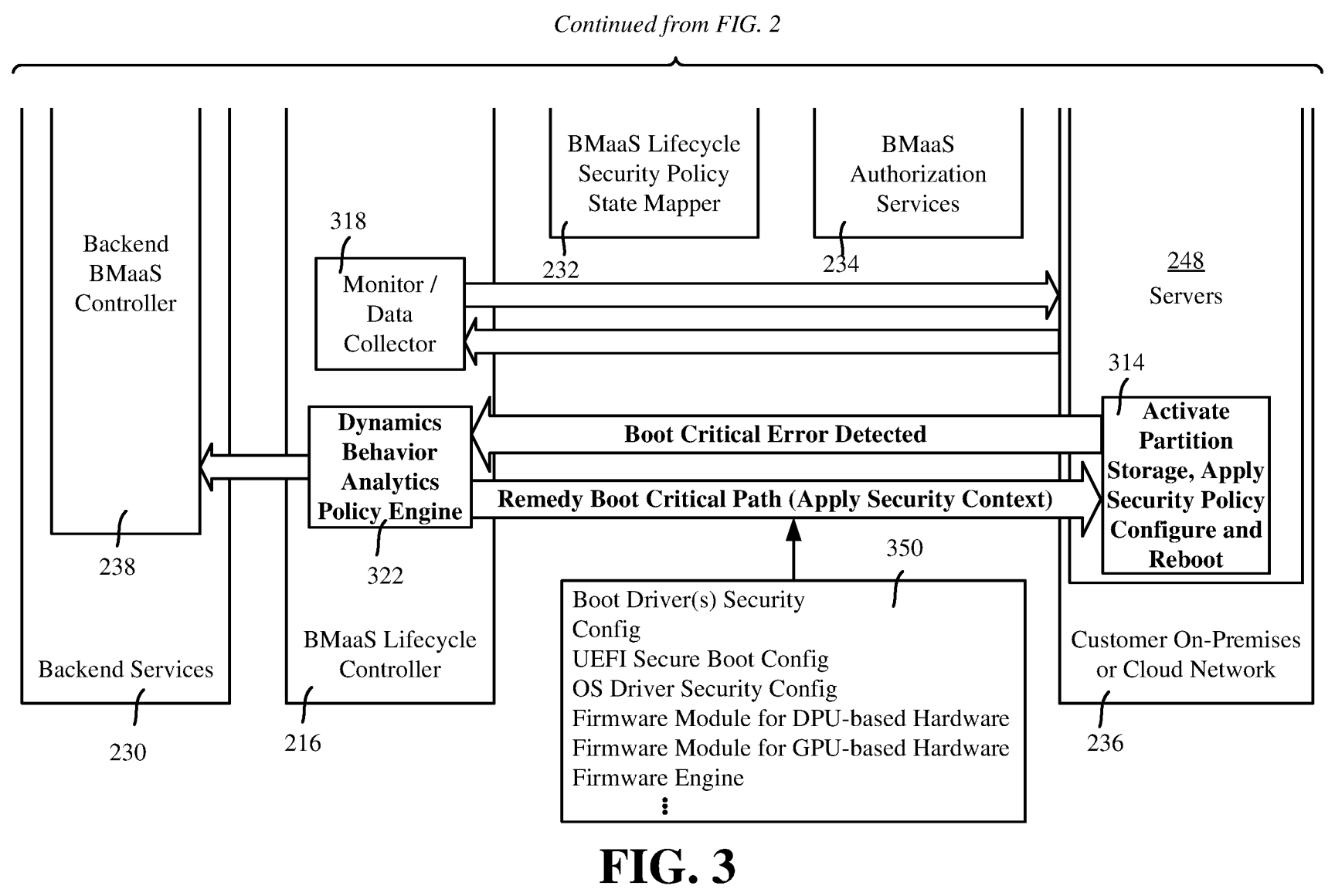

*Continued from FIG. 2*

248 Servers

314 — Activate Partition Storage, Apply Security Policy Configure and Reboot

236 — Customer On-Premises or Cloud Network

234 — BMaaS Authorization Services

232 — BMaaS Lifecycle Security Policy State Mapper

Boot Critical Error Detected

Remedy Boot Critical Path (Apply Security Context)

350 — Boot Driver(s) Security Config
UEFI Secure Boot Config
OS Driver Security Config
Firmware Module for DPU-based Hardware
Firmware Module for GPU-based Hardware
Firmware Engine
...

318 — Monitor / Data Collector

322 — Dynamics Behavior Analytics Policy Engine

216 — BMaaS Lifecycle Controller

238 — Backend BMaaS Controller

230 — Backend Services

FIG. 3 begin

402 — BMaaS Lifecycle Provisioning Controller

404 — Onboard / Provisioning Service

406 — Onboard / Provisioning Security Policies

408 — BMaaS Authorization Services

410 — Authorization Scopes (onboarding)

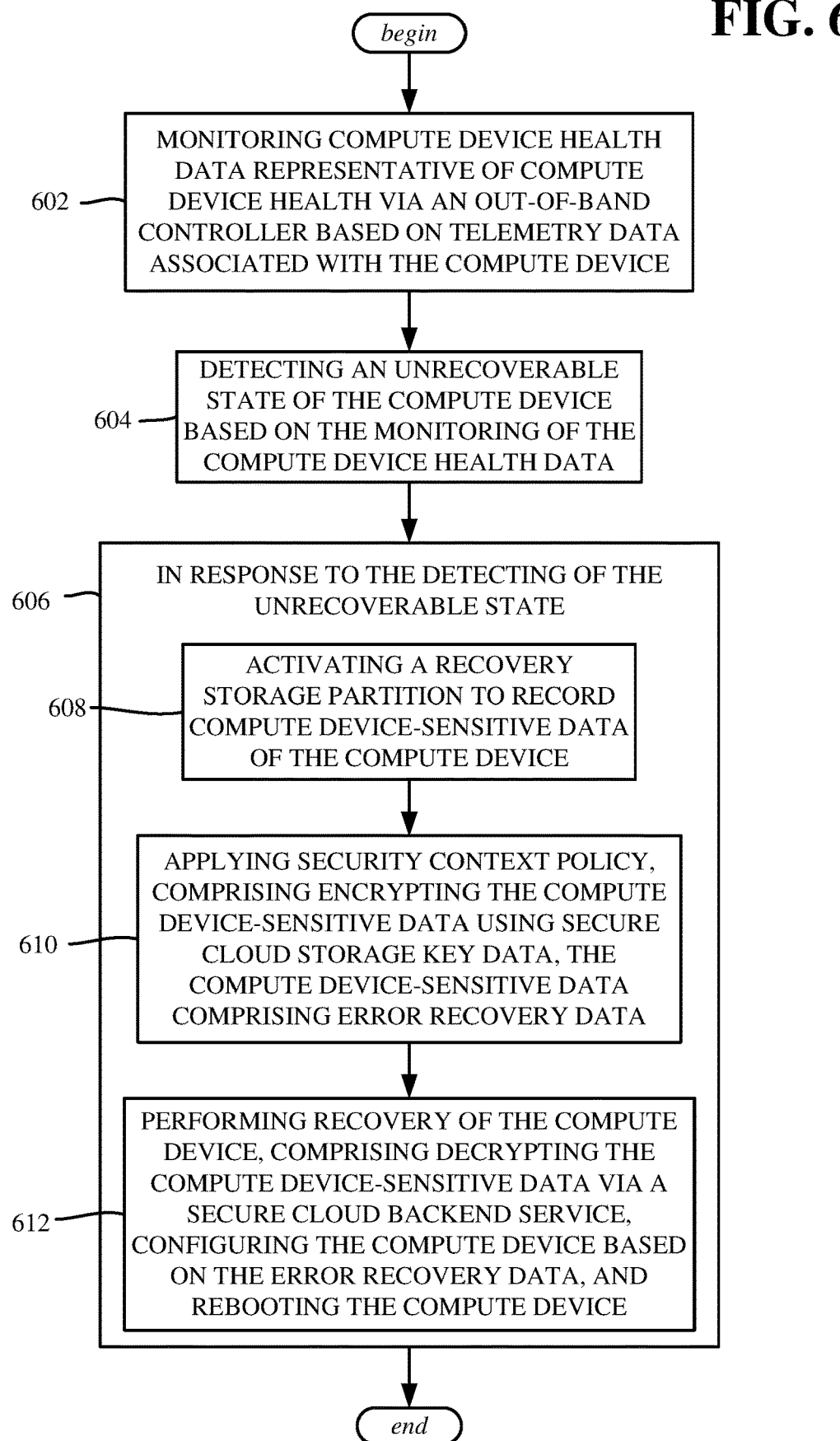

begin

602 — MONITORING COMPUTE DEVICE HEALTH DATA REPRESENTATIVE OF COMPUTE DEVICE HEALTH VIA AN OUT-OF-BAND CONTROLLER BASED ON TELEMETRY DATA ASSOCIATED WITH THE COMPUTE DEVICE

604 — DETECTING AN UNRECOVERABLE STATE OF THE COMPUTE DEVICE BASED ON THE MONITORING OF THE COMPUTE DEVICE HEALTH DATA

606 — IN RESPONSE TO THE DETECTING OF THE UNRECOVERABLE STATE

608 — ACTIVATING A RECOVERY STORAGE PARTITION TO RECORD COMPUTE DEVICE-SENSITIVE DATA OF THE COMPUTE DEVICE

610 — APPLYING SECURITY CONTEXT POLICY, COMPRISING ENCRYPTING THE COMPUTE DEVICE-SENSITIVE DATA USING SECURE CLOUD STORAGE KEY DATA, THE COMPUTE DEVICE-SENSITIVE DATA COMPRISING ERROR RECOVERY DATA

612 — PERFORMING RECOVERY OF THE COMPUTE DEVICE, COMPRISING DECRYPTING THE COMPUTE DEVICE-SENSITIVE DATA VIA A SECURE CLOUD BACKEND SERVICE, CONFIGURING THE COMPUTE DEVICE BASED ON THE ERROR RECOVERY DATA, AND REBOOTING THE COMPUTE DEVICE end

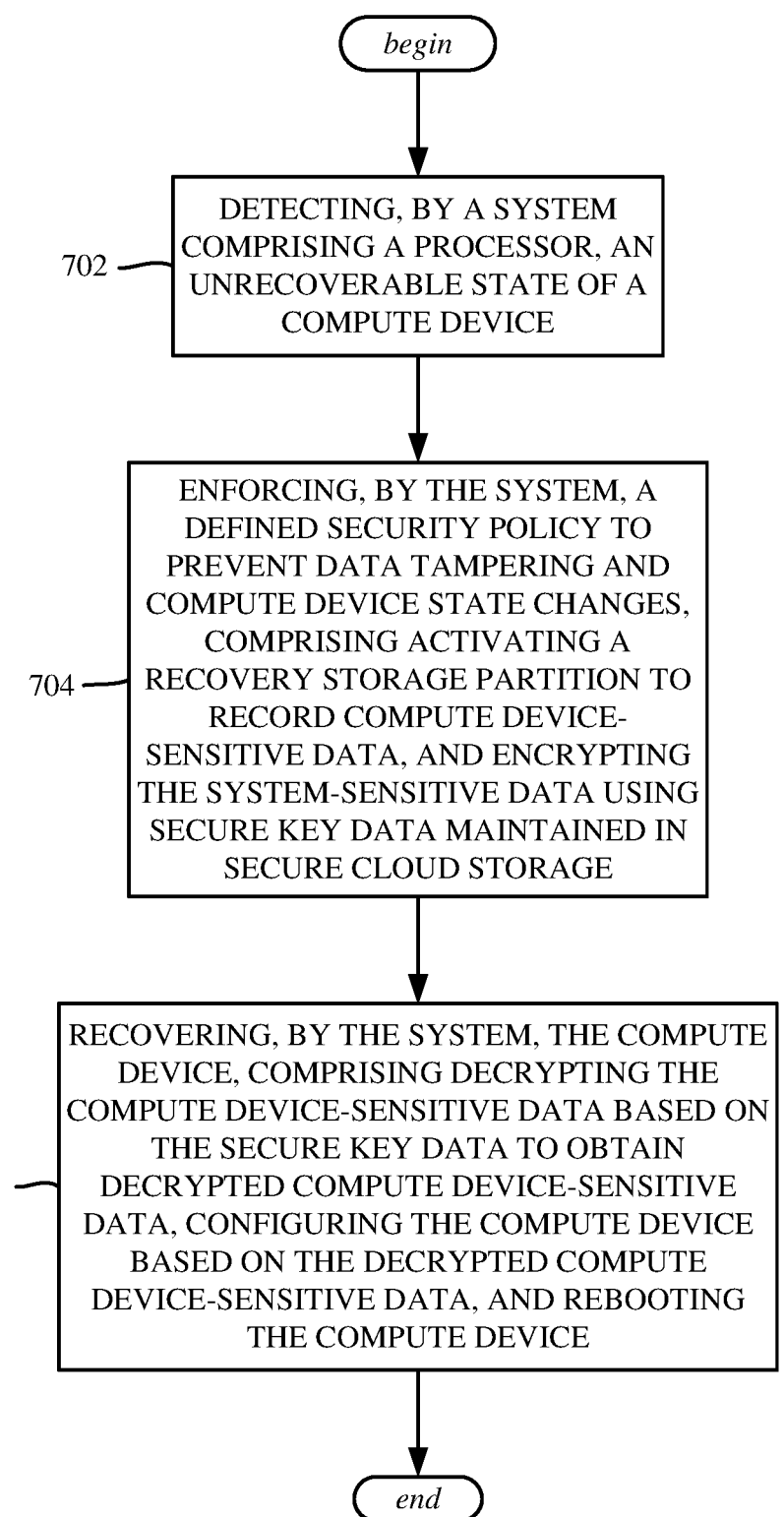

begin

702 — DETECTING, BY A SYSTEM COMPRISING A PROCESSOR, AN UNRECOVERABLE STATE OF A COMPUTE DEVICE

704 — ENFORCING, BY THE SYSTEM, A DEFINED SECURITY POLICY TO PREVENT DATA TAMPERING AND COMPUTE DEVICE STATE CHANGES, COMPRISING ACTIVATING A RECOVERY STORAGE PARTITION TO RECORD COMPUTE DEVICE-SENSITIVE DATA, AND ENCRYPTING THE SYSTEM-SENSITIVE DATA USING SECURE KEY DATA MAINTAINED IN SECURE CLOUD STORAGE

706 — RECOVERING, BY THE SYSTEM, THE COMPUTE DEVICE, COMPRISING DECRYPTING THE COMPUTE DEVICE-SENSITIVE DATA BASED ON THE SECURE KEY DATA TO OBTAIN DECRYPTED COMPUTE DEVICE-SENSITIVE DATA, CONFIGURING THE COMPUTE DEVICE BASED ON THE DECRYPTED COMPUTE DEVICE-SENSITIVE DATA, AND REBOOTING THE COMPUTE DEVICE end

FIG. 7

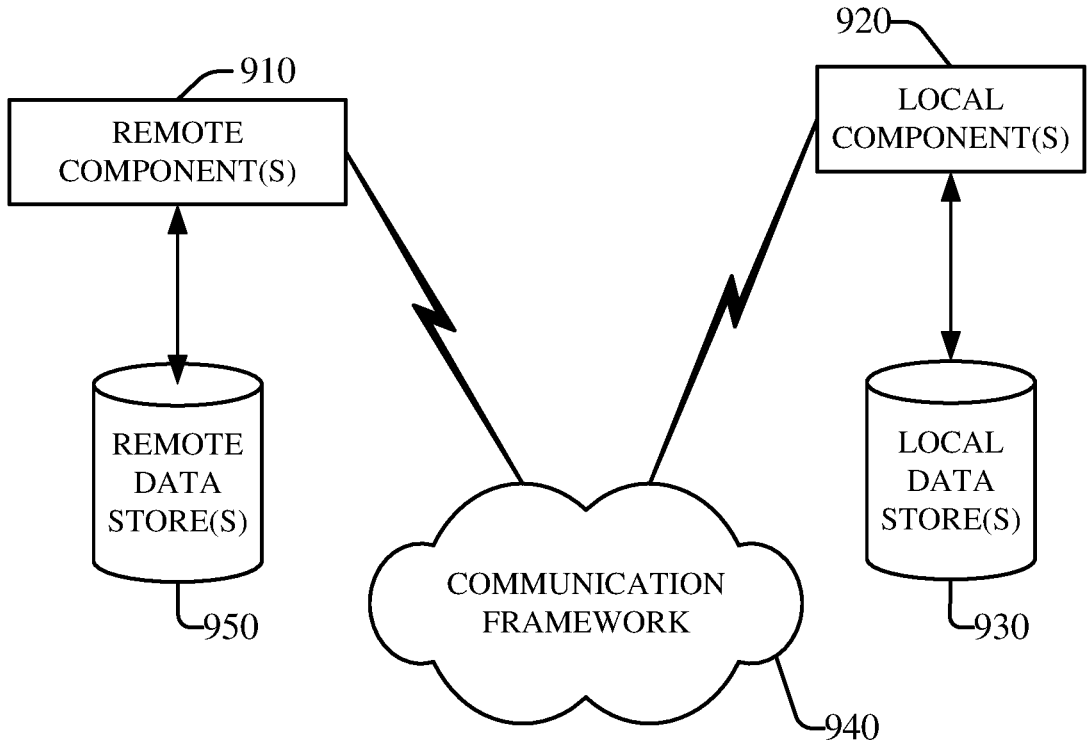
FIG. 9

CONTEXTUAL SECURITY POLICY ENGINE FOR COMPUTE NODE CLUSTERS

BACKGROUND

Bare metal provisioning refers to the deployment of in-band (Host) and out-of-band (out-of-band controller) system configurations, and a host application stack. In a bare metal server deployment, the operating systems and applications run on physical servers, rather than being virtualized. The system servers can be arranged as compute node clusters in a cloud network or deployed at on-premises location(s) of a customer.

Some of the key challenges in bare metal provisioning are that remote management and retrieving system states (boot errors, unrecoverable states, and the like) of a failed system is a challenging and time-consuming, manual tedious process. Further, unauthorized access to system-sensitive data such as system logs, error data, recovery data and other system change data that is associated with a compute device in a failure state is a vulnerability that can lead to non-compliance, and may expose a network to malicious attacks, including data tampering and unauthorized system state changes.

BRIEF DESCRIPTION OF THE DRAWINGS

The technology described herein is illustrated by way of example and not limited in the accompanying figures in which like reference numerals indicate similar elements and in which:

FIGS. 2 and 3 comprise a block diagram representation of an example security policy implementation that can be applied to mitigate security issues during runtime and when a compute device (e.g., server) is in a failure state, in accordance with various aspects and implementations of the subject disclosure.

FIG. 6 is a flow diagram showing example operations related to monitoring for and detecting a compute device in an unrecoverable state, and taking security context policy-related actions, in accordance with various aspects and implementations of the subject disclosure.

FIG. 7 is a flow diagram showing example operations related to enforcing a defined security policy to prevent data tampering and compute device state changes to a compute device while in an unrecoverable state, in accordance with various aspects and implementations of the subject disclosure.

FIG. 9 is a block diagram representing an example computing environment into which aspects of the subject matter described herein may be incorporated.

DETAILED DESCRIPTION

Various aspects of the technology described herein are generally directed towards a dynamic security policy aware engine that enforces customer compliance requirements to achieve strict security compliance in a bare metal provisioning system.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations. It also should be noted that terms used herein, such as "optimize," "optimization," "optimal" and the like only represent objectives to move towards a more optimal state, rather than necessarily obtaining ideal results. For example, "optimal" can refer to a time value that is based on the data that is available (e.g., the current conditions of the network and/or user equipment), rather than necessarily achieving a fully optimal time value result. Similarly, "maximize" means moving towards a maximal state (e.g., up to some threshold or practical limit, if any), rather than necessarily achieving such a state.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
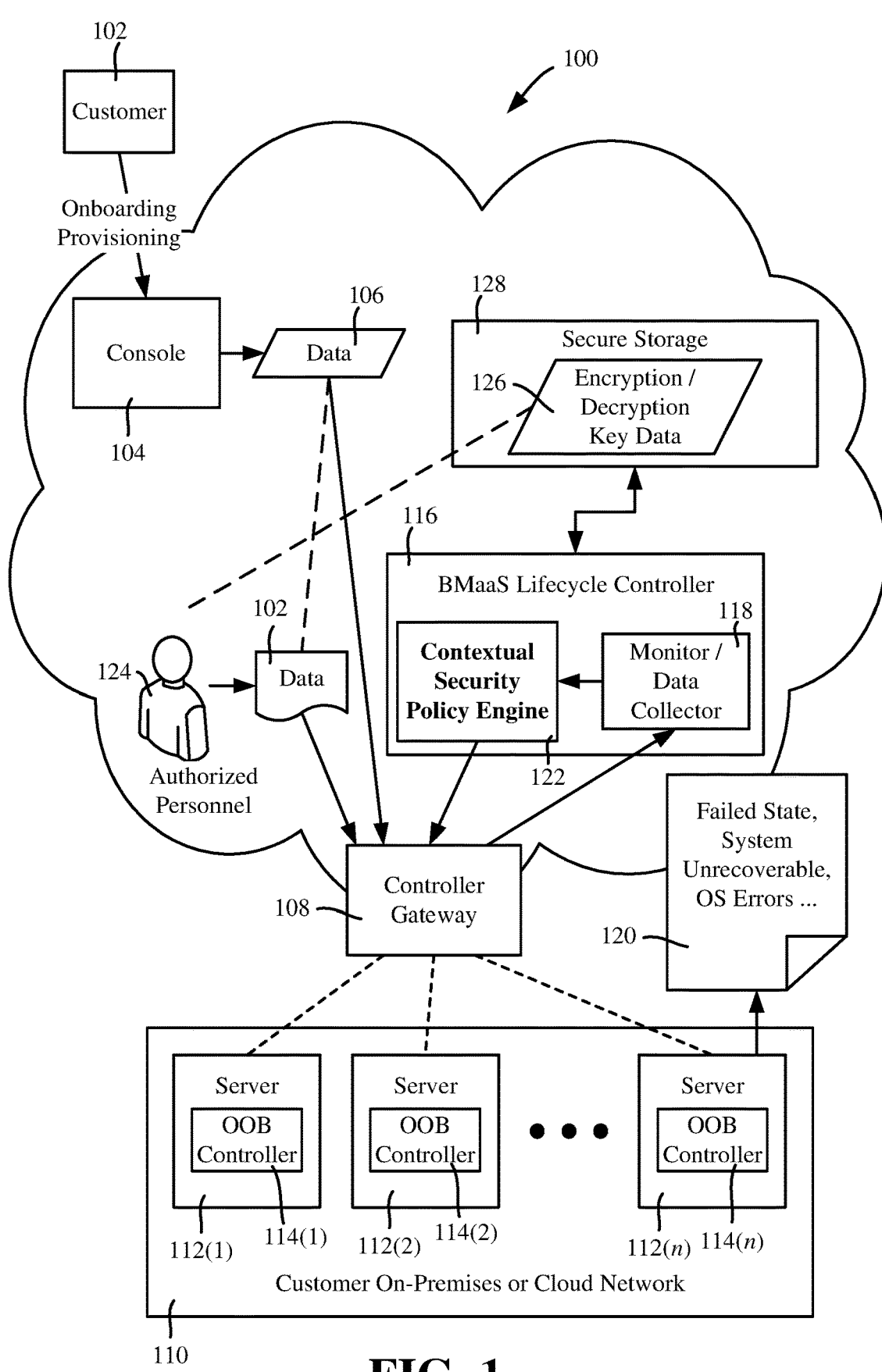
FIG. 1 depicts an example representation of a system/architecture including a cloud deployment model of bare metal as a service (BMaaS) configured with a contextual security policy engine, in accordance with various aspects and implementations of the subject disclosure.

FIG. 1 is an example representation of an example system/architecture 100 including a bare metal as a service (BMaaS) deployment model in which a customer 102 (e.g., enterprise consumer) has contracted with a service provider to provide and help manage the hardware, firmware and software associated with bare metal compute node cluster (s). In the example of FIG. 1, the customer interacts with a console 104, including providing data 106 for onboarding/provisioning-related operations.

Once provisioned, a controller gateway 108 couples various components to one or more compute node clusters of deployed compute devices, which can be located on-premises at a customer location(s) and/or in a (private) cloud network. In the example of FIG. 1, a compute node cluster 110 includes a number of servers 112(1)-112($n$). Each of these "in-band" servers 112(1)-112($n$) includes or is coupled to an out-of-band (OOB) controller (network) 114(1)-114($n$), respectively, in which an out-of-band (OOB) controller is generally hardware coupled to the server motherboard that facilitates remote update and management of a server, including when the server is turned off or in a non-responsive failure state.

In FIG. 1, a BMaaS lifecycle controller 116 includes a component 118 that monitors and collects data from the servers 112(1)-112(*n*), including monitoring telemetry data corresponding to the servers' operations that can indicate when a server enters a failed state and is unrecoverable. In the example of FIG. 1, consider that the server 112(*n*) has failed, and that the monitor/data collector component 118 has detected (e.g., via the information in block 120) an unrecoverable failure state.

As described herein, when a server (e.g., the server 112(*n*)) is detected to be in an unrecoverable failure state, a contextual security policy engine 122 operates automatically to apply and enforce defined security policy (e.g., defined by the customer) to mitigate non-compliant systems from exploiting vulnerabilities that can exist because of the failure. Among various operations, the contextual security policy engine 122 communicates with the out-of-band (OOB) controller (network) 114(*n*) to take protective and recovery actions as described herein, including operating to encrypt sensitive data on the server and reconfigure and reboot the server. Note that authorized personnel 124 may be involved in the recovery operations, including accessing the encryption/decryption key data 126, maintained in secure cloud storage 128, to decrypt the encrypted data as appropriate.

Figure 2:
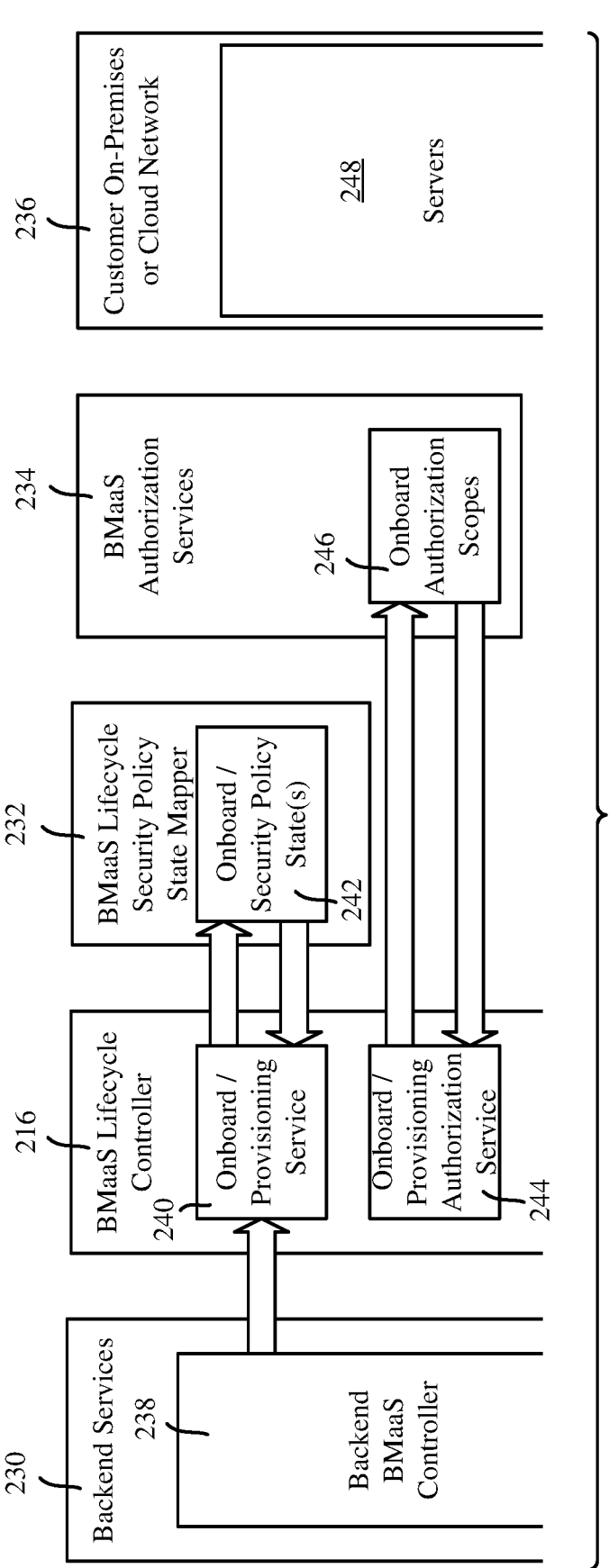

FIGS. 2 and 3 comprise a block diagram that facilitates integration of cloud resource monitoring of unrecoverable compute device (e.g., server states) and enforcement of security policies to mitigate/protect against security vulnerabilities and perform recovery operations. In FIGS. 2 and 3, example components include backend services 230, a BMaaS lifecycle controller 216, a BMaaS lifecycle security policy state mapper 232, BMaaS authorization services 234 and a customer on-premises or cloud network 236.

As shown in FIG. 2, with respect to onboarding, a backend BMaaS controller 238 of the backend services 230 communicates with an onboard provisioning service 240 of the BMaaS lifecycle controller 216, which in turn communicates with onboard/security policy state(s) 242 of the BMaaS lifecycle security policy state mapper 232. The BMaaS lifecycle controller 216 also includes onboard/provisioning authorization service 244, which communicates with onboard authorization scopes 246 of the BMaaS authorization services 234 to ensure authorized onboarding. The components are further described with reference to FIG. 3.

As shown in FIG. 3, a monitor data collector component 318 collects data from the servers 248, e.g., telemetry data, as generally described with reference to FIG. 1. Further, an out-of-band network 314 is coupled to a dynamics behavior analytics policy engine 322 (corresponding to the contextual security policy engine 122 of FIG. 1), including to notify the policy engine 322 when a boot critical error is detected. In this way, an unrecoverable server state is detected. As described herein, the policy engine 322 applies the security policy context (data) to remedy the boot critical path issue.

In general and as described herein, the policy engine 322 and the out-of-band network 314 cooperate to remedy the unrecoverable failure, include to activate partition storage, apply security policy configure and reboot. Various sensitive, security-related data 350 that can be sent to the out-of-band network include, but are not limited to, boot driver (s) security data, configuration data, unified extensible firmware interface (UEFI) secure boot configuration data, operating system driver security configuration data, firmware module(s) for data processing unit (DPU)-based hardware, firmware module(s) for graphics processing unit (GPU)-based hardware, and a firmware engine.

In general, the technology described herein monitors, retrieve and analyzes security configuration data stored in recovery partition storage, containing critical logs, error states, and boot critical security data. This facilitates protection of sensitive data and secure recovery.

Further, the contextual security policy engine can be implemented as a dynamic behavior analytics policy engine/a security analytics inference engine on the backend (e.g., BMaaS lifecycle controller) to identify, mitigate and enable solutions for various use cases. example use cases include, but are not limited to, a secure alternate boot path identifier. The secure alternate boot path identifier enables a firmware option on the compute device to load an alternate boot path identified by the inference engine, e.g., to unload any malware or vulnerable firmware device drivers at boot time, and use an alternate secure boot path for loading an enterprise operating system. The secure alternate boot path identifier also enables a group of virtual machines to reconfigure boot paths when the boot identifier has changed.

Another use case example relates to applying firmware patches at runtime based on system logs, and identifier data. For example, network interface card(s), storage, and other devices can have firmware patches applied at runtime with "0" reboot cycle of the edge server.

Thus, as described herein, defined security policy can be applied to endpoints to mitigate security issues, and perform runtime operations. The security policy and the engine described herein are extensible to accommodate other use cases, e.g., virtualization for I/O identifier (quality of service) based on vulnerabilities seen in existing environments.

Figure 4:
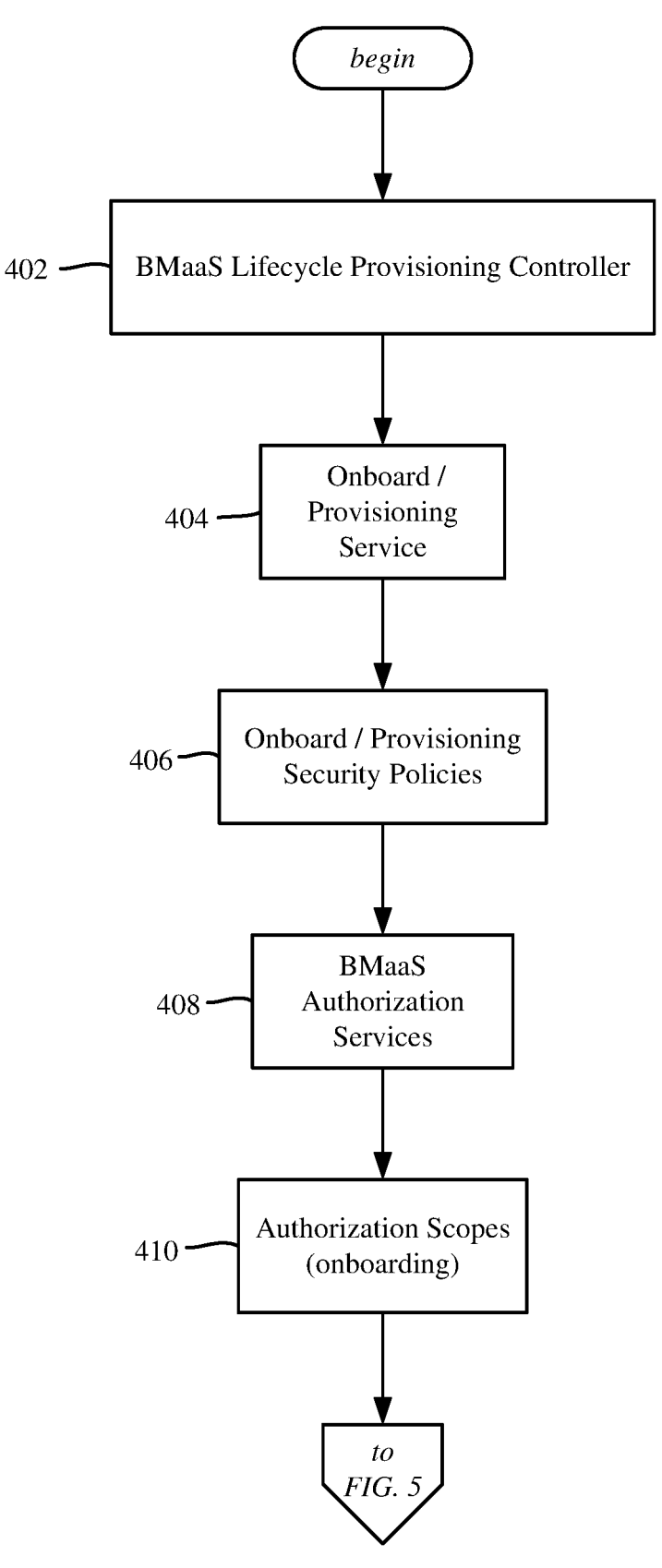
FIGS. 4 and 5 comprise a flow diagram of example operations related to dynamically applying security policy when a compute device/server is detected to be in an unrecoverable state and is not responsive, in accordance with various aspects and implementations of the subject disclosure.
Figure 5:
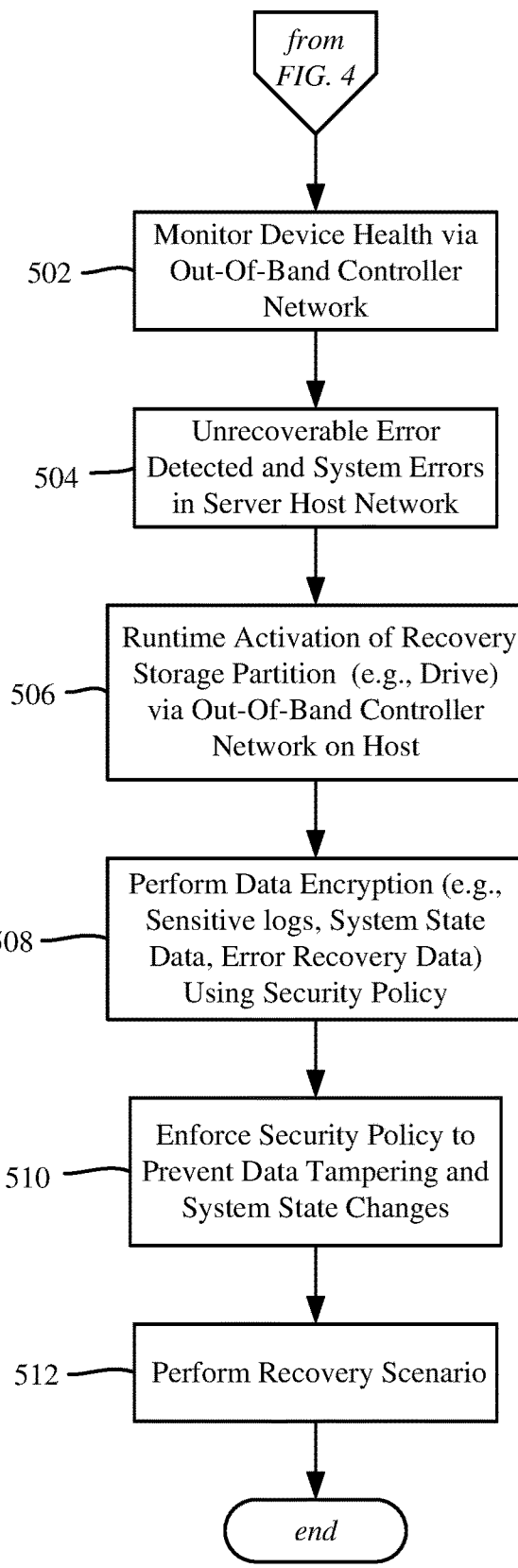

FIGS. 4 and 5 comprise a flow/component diagram in which operations 402-410 of FIG. 4 illustrate the bare metal provisioning of server onboarding. As seen, provisioning involves a BMaaS Lifecycle Provisioning Controller (block 402), an Onboard/Provisioning Service (block 404), and Onboard/Provisioning Security Policies (block 406). Authorization services and scopes (onboarding) are represented by blocks 408 and 410, respectively.

Once the servers are successfully onboarded (e.g., at the customer location) and systems are arranged (e.g., rack-stacked) in a network, operation 502 of FIG. 5 monitors the device health via the out-of-band controller network, e.g., using connectivity module telemetry data services, for example. Monitoring continues, until (in the example of FIG. 5) operation 504 encounters a system unrecoverable state in which the server is not responsive.

When this occurs, the out-of-band controller detects the system error state and activates a recovery storage partition (e.g., OEM partition drive) for recording system-sensitive logs, debug data and error states. Security policy operates at operation 508 to perform data encryption, e.g., the debug states and logged information is encrypted per the system/customer-defined security policies.

At operation 510, the security policy is enforced on system logs and other sensitive data to prevent data tampering and malicious attacks. At operation 512, a recovery scenario is performed, which may involve authorized service personnel performing certain actions.

One or more aspects can be embodied in a system, such as represented in the example operations of FIG. 6, and for example can include a memory that stores computer executable components and/or operations, and a processor that executes computer executable components and/or operations stored in the memory. Example operations can include operation 602, which represents monitoring compute device health data representative of compute device health via an out-of-band controller based on telemetry data associated with the compute device.

Example operation 602 represents detecting an unrecoverable state of the compute device based on the monitoring of the compute device health data. In response to the detecting of the unrecoverable state, example operation 604 represents activating a recovery storage partition to record compute device-sensitive data of the compute device (example operation 606), applying security context policy, comprising encrypting the compute device-sensitive data using secure cloud storage key data, the compute device-sensitive data comprising error recovery data (example operation 608), and performing recovery of the compute device, comprising decrypting the compute device-sensitive data via a secure cloud backend service, configuring the compute device based on the error recovery data, and rebooting the compute device (example operation 610).

The compute device-sensitive data can include boot driver security configuration data.

The compute device-sensitive data can include configuration data.

The compute device-sensitive data can include unified extensible firmware interface secure boot configuration data.

The compute device-sensitive data can include operating system driver security configuration data.

Performing the recovery of the compute device further can include loading a firmware module for graphics processing unit-based hardware based on settings data of the security context policy.

Performing the recovery of the compute device further can include loading a firmware module for data processing unit-based hardware based on settings data of the security context policy.

Performing the recovery of the compute device further can include loading a firmware engine based on settings data of the security context policy.

Settings data of the security context policy can include a secure alternate boot path identifier, and rebooting of the compute device can include using a boot path corresponding to the secure alternate boot path identifier.

Settings data of the security context policy can include a first secure alternate boot path identifier, and further operations can include changing the first secure alternate boot path identifier to a second secure alternate boot path identifier to facilitate reconfiguring of respective boot paths by respective virtual machines.

The compute device-sensitive data can include debug data.

The compute device-sensitive data can include error state data.

The compute device-sensitive data can include logged data.

Further operations can include applying a firmware patch based on the logged data.

One or more example aspects, such as corresponding to example operations of a method, are represented in FIG. 7. Example operation 702 represents detecting, by a system comprising a processor, an unrecoverable state of a compute device. Example operation 704 represents enforcing, by the system, a defined security policy to prevent data tampering and compute device state changes, comprising activating a recovery storage partition to record compute device-sensitive data, and encrypting the system-sensitive data using secure key data maintained in secure cloud storage. Example operation 706 represents recovering, by the system, the compute device, comprising decrypting the compute device-sensitive data based on the secure key data to obtain decrypted compute device-sensitive data, configuring the compute device based on the decrypted compute device-sensitive data, and rebooting the compute device.

Encrypting the compute device-sensitive data can include encrypting compute device debug state data and compute device log data.

Rebooting of the compute device can include using a boot path based on an identifier associated with the defined security policy.

Figure 8:
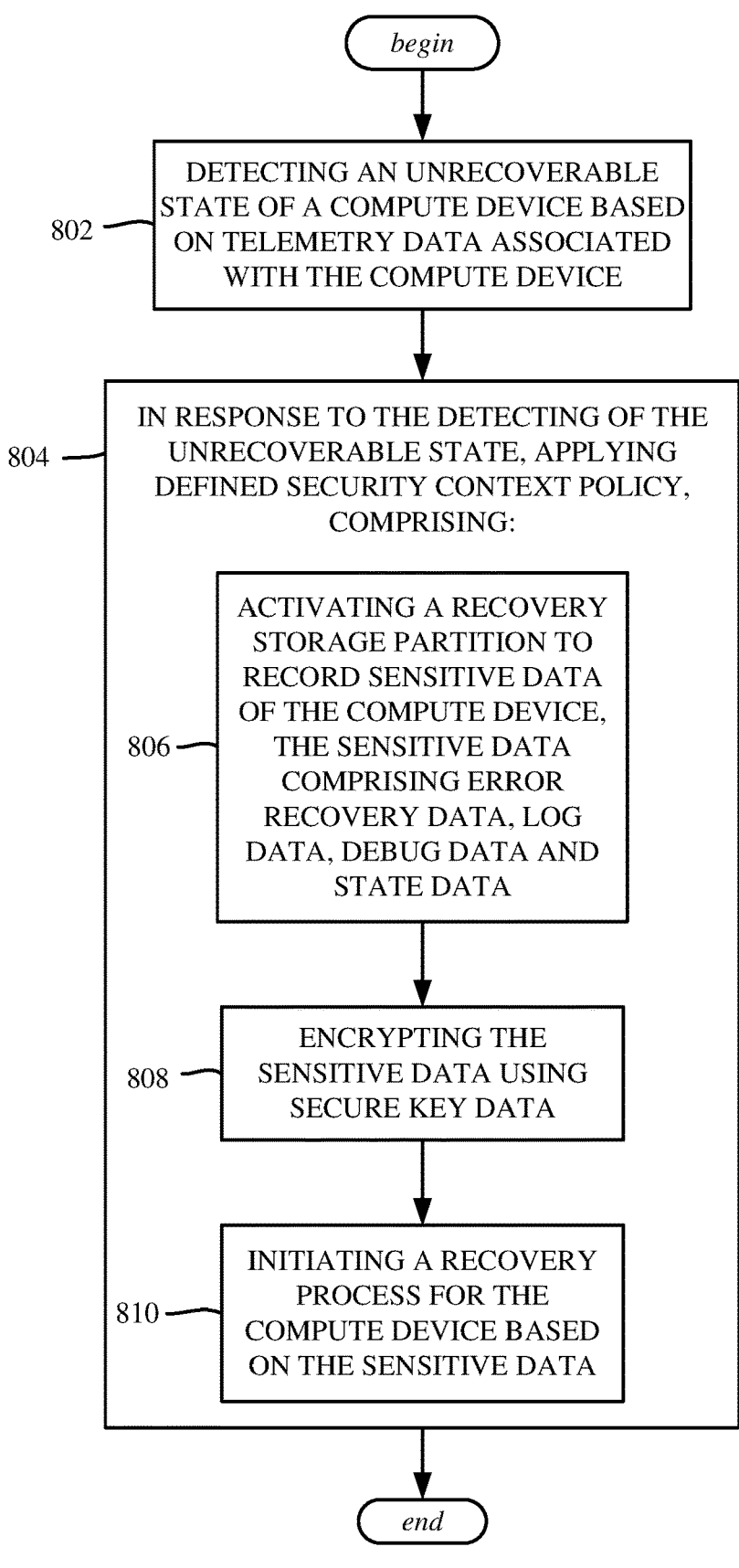
FIG. 8 is a flow diagram showing example operations related to applying security context policy-related actions upon detecting a compute device in an unrecoverable state, in accordance with various aspects and implementations of the subject disclosure.

FIG. 8 summarizes various example operations, e.g., corresponding to a machine-readable medium, comprising executable instructions that, when executed by a processor, facilitate performance of operations. Example operation 802 represents detecting an unrecoverable state of a compute device based on telemetry data associated with the compute device. Example operation 804 represents, in response to the detecting of the unrecoverable state, applying defined security context policy, comprising: activating a recovery storage partition to record sensitive data of the compute device, the sensitive data comprising error recovery data, log data, debug data and state data (example operation 806), encrypting the sensitive data using secure key data (example operation 808), and initiating a recovery process for the compute device based on the sensitive data (example operation 810).

Initiating the recovery process can include at least one of: loading a firmware module for graphics processing unit-based hardware associated with the compute device, loading a firmware module for data processing unit-based hardware associated with the compute device, loading a firmware engine associated with the compute device, or applying a firmware patch to firmware associated with the compute device.

Further operations can include rebooting the compute device via a specified boot path that is different from a prior boot path used that led to the unrecoverable state of a compute device.

As can be seen, the technology described herein facilitates the monitoring, retrieval and analysis of security configuration data that are stored partition recovery storage (e.g., OEM partition drives), which contain critical logs, error states and boot critical security data. Also described is a policy engine configured to enforce security context configuration policies for mitigating/preventing malicious attacks on the backend services.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise an automatic scaling component and/or programs that communicate/use the remote resources 910, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
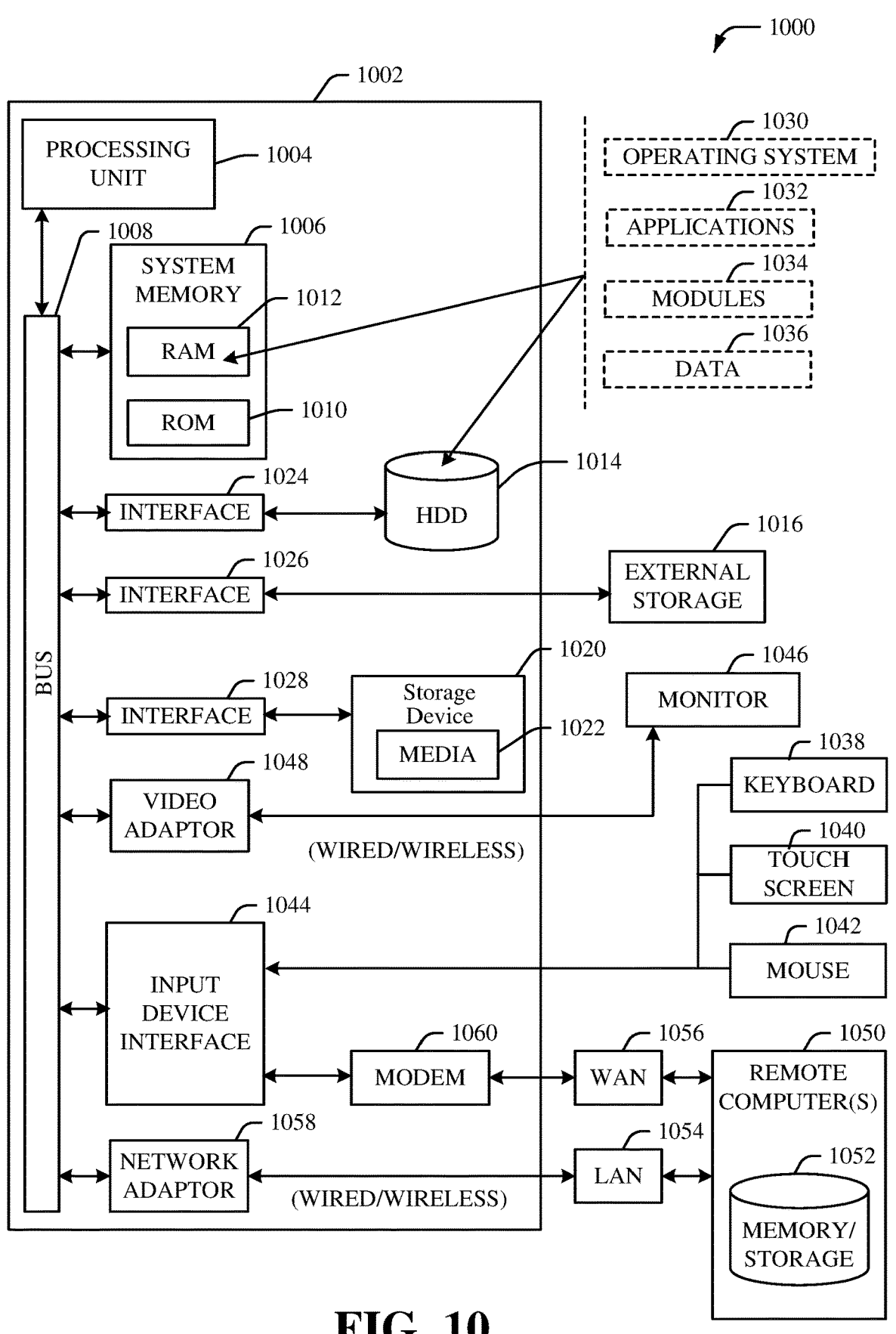
FIG. 10 depicts an example schematic block diagram of a computing environment with which the disclosed subject matter can interact/be implemented at least in part, in accordance with various aspects and implementations of the subject disclosure.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014.

Other internal or external storage can include at least one other storage device 1020 with storage media 1022 (e.g., a solid state storage device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device(s) 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1094 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

one or more processors; and one or more memories that stores executable instructions that, when executed by the one or more processors, facilitate performance of operations, the operations comprising:

monitoring compute device health data representative of compute device health via an out-of-band controller based on telemetry data associated with the compute device;

detecting an unrecoverable state of the compute device based on the monitoring of the compute device health data;

in response to the detecting of the unrecoverable state, activating a recovery storage partition to record compute device-sensitive data of the compute device, applying security context policy, comprising encrypting the compute device-sensitive data using secure cloud storage key data, the compute device-sensitive data comprising error recovery data, wherein the security context policy further comprises a secure alternate boot path identifier of a group of secure alternate boot path identifiers generated by a backend inference engine, and wherein the secure alternate boot path identifier is accessible to at least one virtual machine instance of a group of virtual machine instances operational on the one or more processors, and performing recovery of the compute device, comprising decrypting the compute device-sensitive data via a secure cloud backend service, configuring the compute device based on the error recovery data, and rebooting the compute device.

2. The system of claim 1, wherein the compute device-sensitive data comprises boot driver security configuration data.

3. The system of claim 1, wherein the compute device-sensitive data comprises configuration data.

4. The system of claim 1, wherein the compute device-sensitive data comprises unified extensible firmware interface secure boot configuration data.

5. The system of claim 1, wherein the compute device-sensitive data comprises firmware module for data processing unit-based hardware operating system driver security configuration data.

6. The system of claim 1, wherein the performing of the recovery of the compute device further comprises loading a firmware module for graphics processing unit-based hardware based on settings data of the security context policy.

7. The system of claim 1, wherein the performing of the recovery of the compute device further comprises loading a firmware module for data processing unit-based hardware based on settings data of the security context policy.

8. The system of claim 1, wherein the performing of the recovery of the compute device further comprises loading a firmware engine based on settings data of the security context policy.

9. The system of claim 1, wherein the rebooting of the compute device comprises using a boot path corresponding to the secure alternate boot path identifier.

10. The system of claim 1, wherein settings data of the security context policy comprises a first secure alternate boot path identifier, and wherein the operations further comprise changing the first secure alternate boot path identifier to a second secure alternate boot path identifier to facilitate reconfiguring of respective boot paths by respective virtual machine instances of the group of virtual machine instances.

11. The system of claim 1, wherein the compute device-sensitive data comprises debug data.

12. The system of claim 1, wherein the compute device-sensitive data comprises error state data.

13. The system of claim 1, wherein the compute device-sensitive data comprises logged data.

14. The system of claim 13, wherein the operations further comprise applying a firmware patch based on the logged data.

15. A method, comprising:

detecting, by a system comprising at least one processor, an unrecoverable state of a compute device;

enforcing, by the system, a defined security policy to prevent data tampering and compute device state changes, comprising activating a recovery storage partition to record compute device-sensitive data, and encrypting the system-sensitive data using secure key data maintained in secure cloud storage, wherein the defined security policy further comprises a secure alternate boot path identifier of a group of secure alternate boot path identifiers generated by a backend inference engine, and wherein the secure alternate boot path identifier is accessible to at least one virtual machine instance of a group of virtual machine instances functioning on the at least one processor; and recovering, by the system, the compute device, comprising decrypting the compute device-sensitive data based on the secure key data to obtain decrypted compute device-sensitive data, configuring the compute device based on the decrypted compute device-sensitive data, and rebooting the compute device.

16. The method of claim 15, wherein the encrypting of the compute device-sensitive data comprises encrypting compute device debug state data and compute device log data.

17. The method of claim 15, wherein the rebooting of the compute device comprises using a boot path based on an identifier associated with the defined security policy.

18. A non-transitory machine-readable medium, comprising executable instructions that, when executed by one or more processors, facilitate performance of operations, the operations comprising:

detecting an unrecoverable state of a compute device based on telemetry data associated with the compute device;

in response to the detecting of the unrecoverable state, applying defined security context policy, comprising:

activating a recovery storage partition to record sensitive data of the compute device, the sensitive data comprising error recovery data, log data, debug data and state data, generating, by an inference engine, a secure alternate boot path identifier of a group of secure alternate boot path identifiers, wherein the secure alternate boot path identifier is accessible to at least one virtual machine instance of a group of virtual machine instances executing on the one or more processor, and wherein the group of secure alternate boot path identifiers is stored as the sensitive data;

encrypting the sensitive data using secure key data, and initiating a recovery process for the compute device based on the sensitive data.

19. The non-transitory machine-readable medium of claim 18, wherein the initiating of the recovery process comprises at least one of: loading a firmware module for graphics processing unit-based hardware associated with the compute device, loading a firmware module for data processing unit-based hardware associated with the compute device, loading a firmware engine associated with the compute device, or applying a firmware patch to firmware associated with the compute device.

20. The non-transitory machine-readable medium of claim 18, wherein the operations further comprise rebooting the compute device via a specified boot path that is different from a prior boot path used that led to the unrecoverable state of a compute device, and wherein the specified boot path is representative of the secure alternate boot path identifier.

\* \* \* \* \*